United States Patent
Honda

(10) Patent No.: US 10,015,325 B2
(45) Date of Patent: Jul. 3, 2018

(54) IMAGE READING APPARATUS WITH CONNECTION DETECTION, METHOD OF CONTROLLING THE SAME, AND STORAGE MEDIUM

(71) Applicant: CANON KABUSHIKI KAISHA, Tokyo (JP)

(72) Inventor: Norikazu Honda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 14/798,010

(22) Filed: Jul. 13, 2015

(65) Prior Publication Data

US 2016/0036997 A1 Feb. 4, 2016

(30) Foreign Application Priority Data

Jul. 31, 2014 (JP) .................................. 2014-157049

(51) Int. Cl.
  *H04N 1/00* (2006.01)
  *H04N 17/00* (2006.01)

(52) U.S. Cl.
  CPC ....... *H04N 1/00037* (2013.01); *H04N 1/0005* (2013.01); *H04N 1/00013* (2013.01); *H04N 1/00074* (2013.01); *H04N 1/00824* (2013.01); *H04N 17/002* (2013.01)

(58) Field of Classification Search
  None
  See application file for complete search history.

(56) References Cited

U.S. PATENT DOCUMENTS

2003/0184814 A1* 10/2003 Hashizume ........ H04N 1/00708
  358/437
2008/0180756 A1*  7/2008 Nagasaka .......... H04N 1/00002
  358/474
2014/0016007 A1   1/2014 Ogura ........................... 348/300

FOREIGN PATENT DOCUMENTS

| JP | H04-086072 | 3/1992 |
| JP | 2004-088564 | 3/2004 |
| JP | 2007-189429 | 7/2007 |
| JP | 2009-005289 | 1/2009 |
| JP | 2010-093759 | 4/2010 |
| JP | 2010160219 A * | 7/2010 |

(Continued)

OTHER PUBLICATIONS

Translation of japanese patent application JP 2010-160219.*

(Continued)

*Primary Examiner* — Lennin Rodriguezgonzalez
(74) *Attorney, Agent, or Firm* — Fitzpatrick, Cella, Harper & Scinto

(57) ABSTRACT

An image reading apparatus includes a reading unit that has multiple pixels for performing image reading, a driving unit that outputs a driving signal to the pixels of the reading unit, and a connection unit that connects the reading unit to the main body of the image reading apparatus. An identification signal is inserted by the driving unit at a specific pixel among ineffective pixels that do not react to external light among the pixels of the reading unit, and detection of whether or not the reading unit is connected correctly to the main body of the image reading apparatus by the connection unit is performed by examining the signal level of the specific pixel.

18 Claims, 16 Drawing Sheets

(56) References Cited

FOREIGN PATENT DOCUMENTS

JP    2014-022774    2/2014

OTHER PUBLICATIONS

Notification of Reasons for Refusal dated Apr. 16, 2018 in counterpart JP Application No. 2014-157049 with English translation.

* cited by examiner

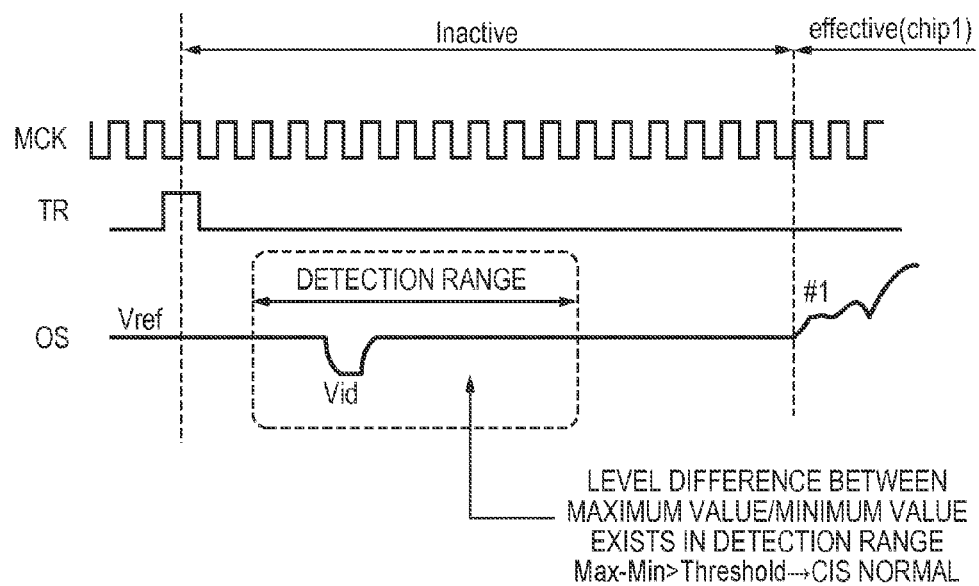
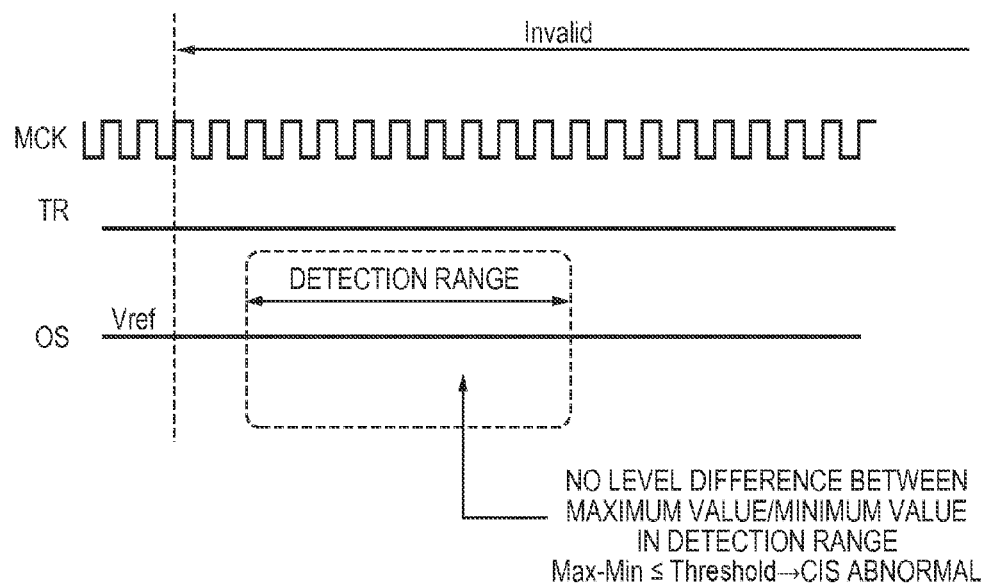

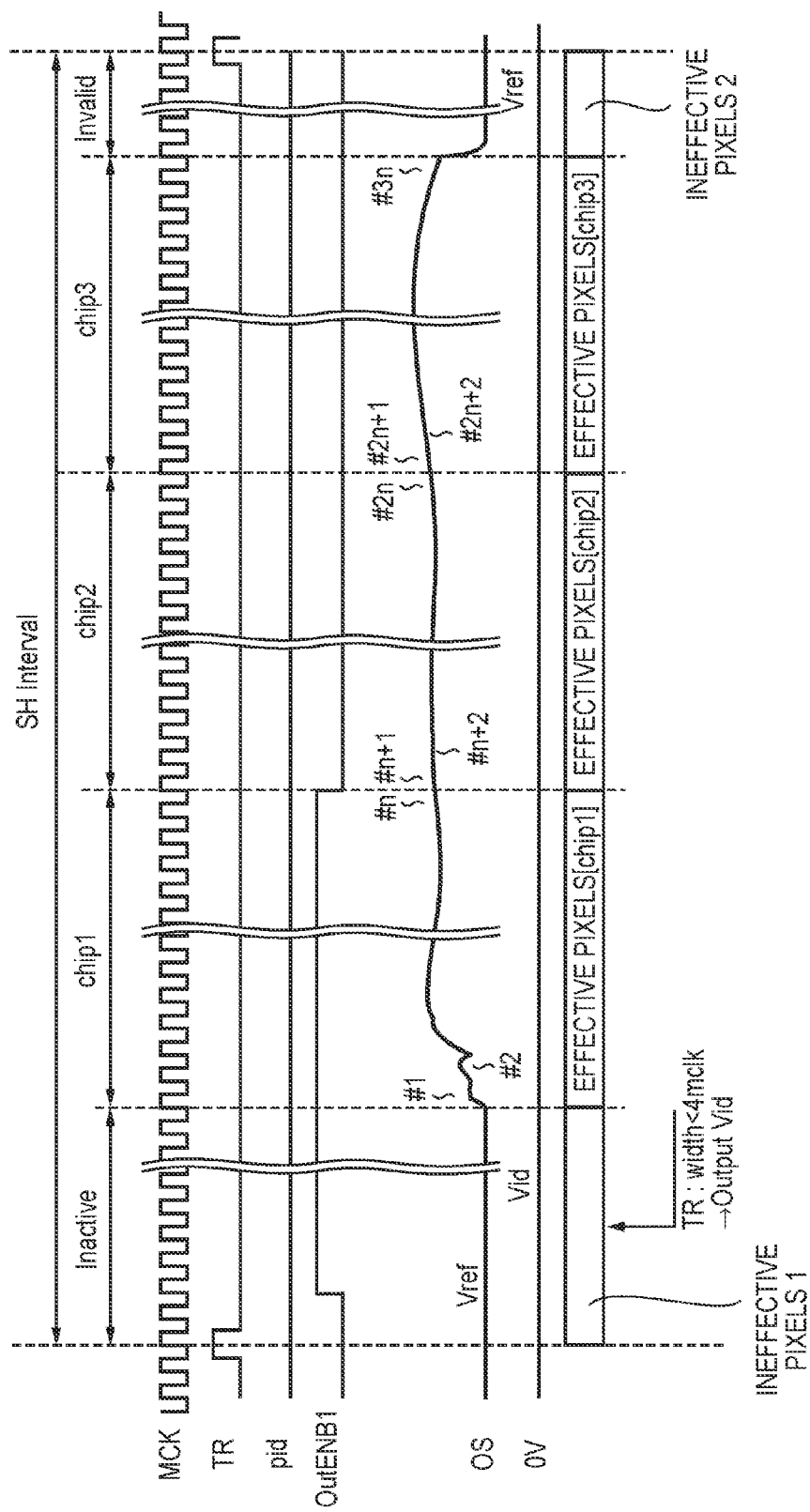

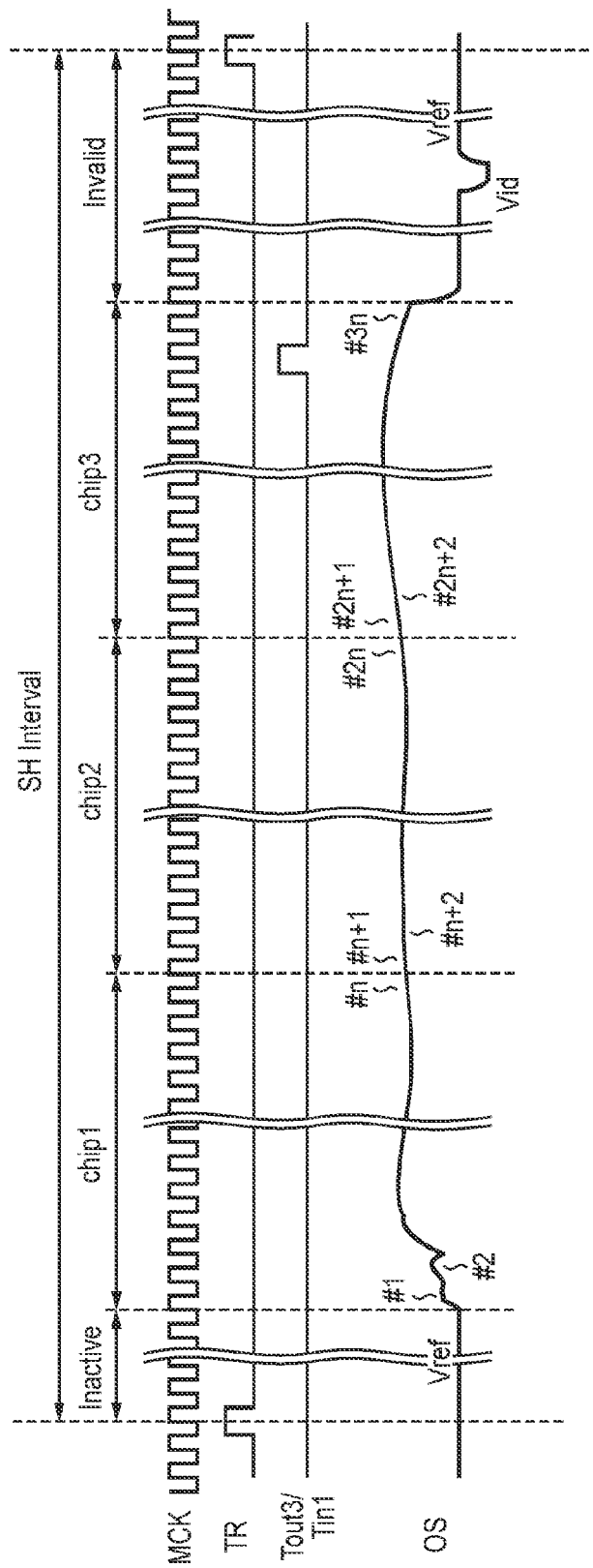

IMAGE READING APPARATUS WITH CONNECTION DETECTION, METHOD OF CONTROLLING THE SAME, AND STORAGE MEDIUM

BACKGROUND OF THE INVENTION

Field of the Invention

The present invention relates to a technique for detecting an abnormal connection of a reading sensor module in an image reading apparatus that optically reads an original.

Description of the Related Art

A control method regarding the detection of abnormalities in a reading sensor of an image reading apparatus is disclosed in Japanese Patent Laid-Open No. 2004-88564. In Japanese Patent Laid-Open No. 2004-88564, the aim is to provide an image reading apparatus that can easily determine whether there are any abnormalities in either the light source for original image illumination or the CCD sensor for original image reading. As a means for solving the problem, in order to detect abnormalities in the CCD sensor without being affected by the light source or external light, the timing of sampling is made variable in the sample and hold circuit that samples and holds the output signal of the CCD sensor. Then, when the CCD sensor is examined, sampling is performed while the CCD sensor output signal has reset noise. Reset noise is detected if the CCD sensor is normal, and reset noise is not detected if there is an abnormality, and thus a CCD sensor abnormality can be detected by determining whether reset noise is present or absent.

However, the reading sensor of Japanese Patent Laid-Open No. 2004-88564 is based on the premise of a CCD sensor, and reset noise is not externally output from a CMOS sensor, and therefore this technique cannot be applied. Also, the voltage that is output in the reset noise is not stable and fluctuates over time. For this reason, the stable sampling of reset noise including variation of the CDD sensor is not easy.

SUMMARY OF THE INVENTION

The present invention has been achieved in light of the above-described problems, and an image reading apparatus that can reliably detect an abnormal connection of the reading sensor is provided.

According to a first aspect of the present invention, there is provided an image reading apparatus comprising: a reading unit that has a plurality of pixels for performing image reading; a driving unit that outputs a driving signal to the plurality of pixels of the reading unit; and a connection unit that connects the reading unit to a main body of the image reading apparatus, wherein an identification signal is inserted by the driving unit at a specific pixel among ineffective pixels that do not react to external light among the plurality of pixels of the reading unit, and detection of whether or not the reading unit is correctly connected to the main body of the image reading apparatus by the connection unit is performed by examining a signal level of the specific pixel.

According to a second aspect of the present invention, there is provided a method of controlling an image reading apparatus that includes a reading unit that has a plurality of pixels for performing image reading, a driving unit that outputs a driving signal to the plurality of pixels of the reading unit, and a connection unit that connects the reading unit to a main body of the image reading apparatus, the method comprising inserting, by the driving unit, an identification signal at a specific pixel among ineffective pixels that do not react to external light among the plurality of pixels of the reading unit, and detecting whether or not the reading unit is connected correctly to the main body of the image reading apparatus by examining a signal level of the specific pixel.

Further features of the present invention will become apparent from the following description of exemplary embodiments with reference to the attached drawings.

BRIEF DESCRIPTION OF THE DRAWINGS

FIG. 3 is a diagram showing a normal waveform in the case where the reading module is connected normally according to the first embodiment.

FIG. 4 is a diagram showing an abnormal waveform in the case where a line synchronization signal is disconnected in the reading module according to the first embodiment.

FIG. 10B is a timing chart for scanning performed by the reading module according to the second embodiment.

FIG. 11A is a timing chart for detection performed by the reading module according to a third embodiment.

DESCRIPTION OF THE EMBODIMENTS

The following is a detailed description of embodiments of the present invention with reference to the accompanying drawings.

First Embodiment

Figure 1:
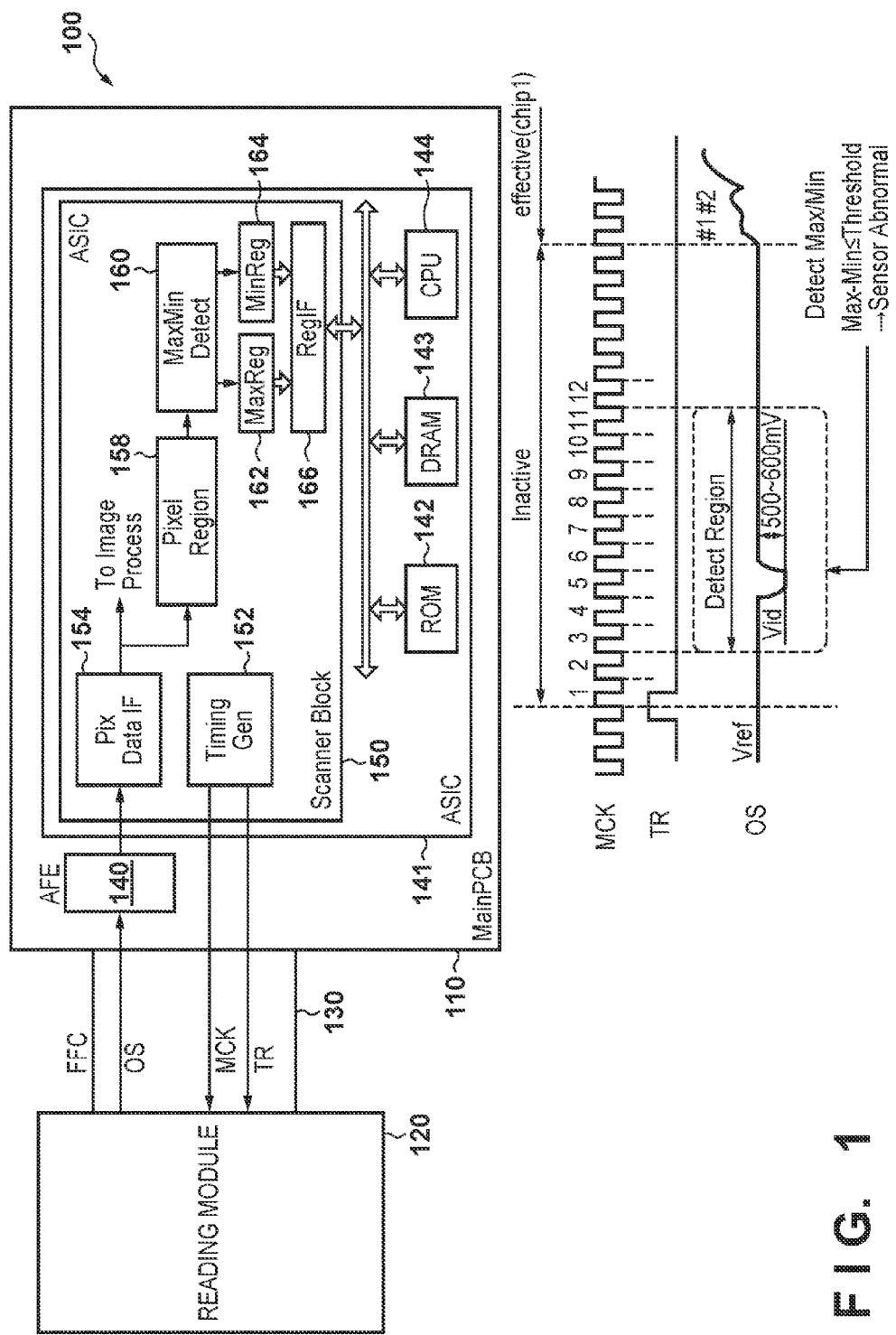
FIG. 1 is a diagram showing an overall configuration of an image reading apparatus according to a first embodiment of the present invention.

FIG. 1 is a diagram showing an overall configuration of an image reading apparatus according to a first embodiment of the present invention. In FIG. 1, an image reading apparatus 100 is configured such that a main circuit board 110 of an image reading apparatus main body and a reading module 120 are connected via an FFC (Flexible Flat Cable) 130. An AFE (Analog Front End) 140 that performs A/D conversion on analog image signals from the reading module 120 and an ASIC (Application Specific Integration Circuit) 141 that performs overall control of the reading apparatus are included on the main circuit board 110. A scanner block 150 is included in the ASIC 141. A TG (Timing Generator) 152 that generates signals that drive a reading sensor inside the reading module 120 is arranged in the scanner block 150. Also, other members arranged in the scanner block include a Pix Data IF (Image Interface) 154 that receives signals from the AFE 140 and converts them into pixel values, a Pixel Region (an image cut-out circuit) 158 that cuts out a range of an image in which connection detection is to be performed, a MaxMin (a maximum/minimum detection circuit) 160 that detects the maximum value and the minimum value within the range, and a MaxReg (a maximum value register) 162 and a MinReg (a minimum value register) 164 that respectively store the maximum value and the minimum value that were detected. A CPU 144, a ROM 142, and a RAM 143 are included in the ASIC 141.

The lower portion of FIG. 1 includes a waveform in the vicinity of the head of one line of the reading module 120. The reading sensor is driven by a clock signal MCK and a line synchronization signal TR, and an analog image signal OS is output. There is an ineffective pixel period (Inactive) of around 100 pixels at the head of the one line of the OS signal before effective pixels are output.

In the present embodiment, an identification signal Vid is embedded to detect abnormal connections in the ineffective pixel period. Normally, the output voltage (signal level) of ineffective pixels that do not react to external light is a reference voltage Vref, and the identification signal Vid is output with a larger voltage or a smaller voltage so as to be able to be distinguished when compared with the reference voltage.

The ASIC 141 receives an output image signal from the reading module 120 via the AFE 140, and cuts out a region of invalid pixels that includes the identification signal Vid. The maximum value (Max) and the minimum value (Min) of the pixel values within the range are detected and stored in respective registers. The two are read out by the CPU 144, and in the case where a difference Max−Min is larger than a threshold value Thresh, it is determined that the connection is normal, and in the case where the difference Max−Min is smaller, it is determined that the connection is abnormal. Note that one example of the case in which an abnormal connection occurs in the reading module 120 is the case in which the OS signal cannot be appropriately received. In this case, the reading module 120 outputs an output image signal that has an identification signal embedded therein at a predetermined timing, but since the ASIC 141 cannot receive this output image signal, it is determined that the difference Max−Min is smaller than the threshold value Thresh. A second example is the case in which a TR signal cannot be appropriately transmitted. A chip 700 that is to be described later executes identification signal embedding processing after receiving the TR signal, but cannot execute identification signal embedding processing if the TR signal is not received. As a result, it is determined that the difference Max−Min is smaller than the threshold value Thresh. A third example is the case in which the chip 700 cannot appropriately receive MCK. In the case in which the chip 700 cannot receive MCK for operating upon receiving the CL signal, the chip 700 will not operate in the first place. As a result, the identification signal embedding processing is not executed, and therefore it is determined that the difference Max−Min is smaller than the threshold value Thresh.

Figure 2:
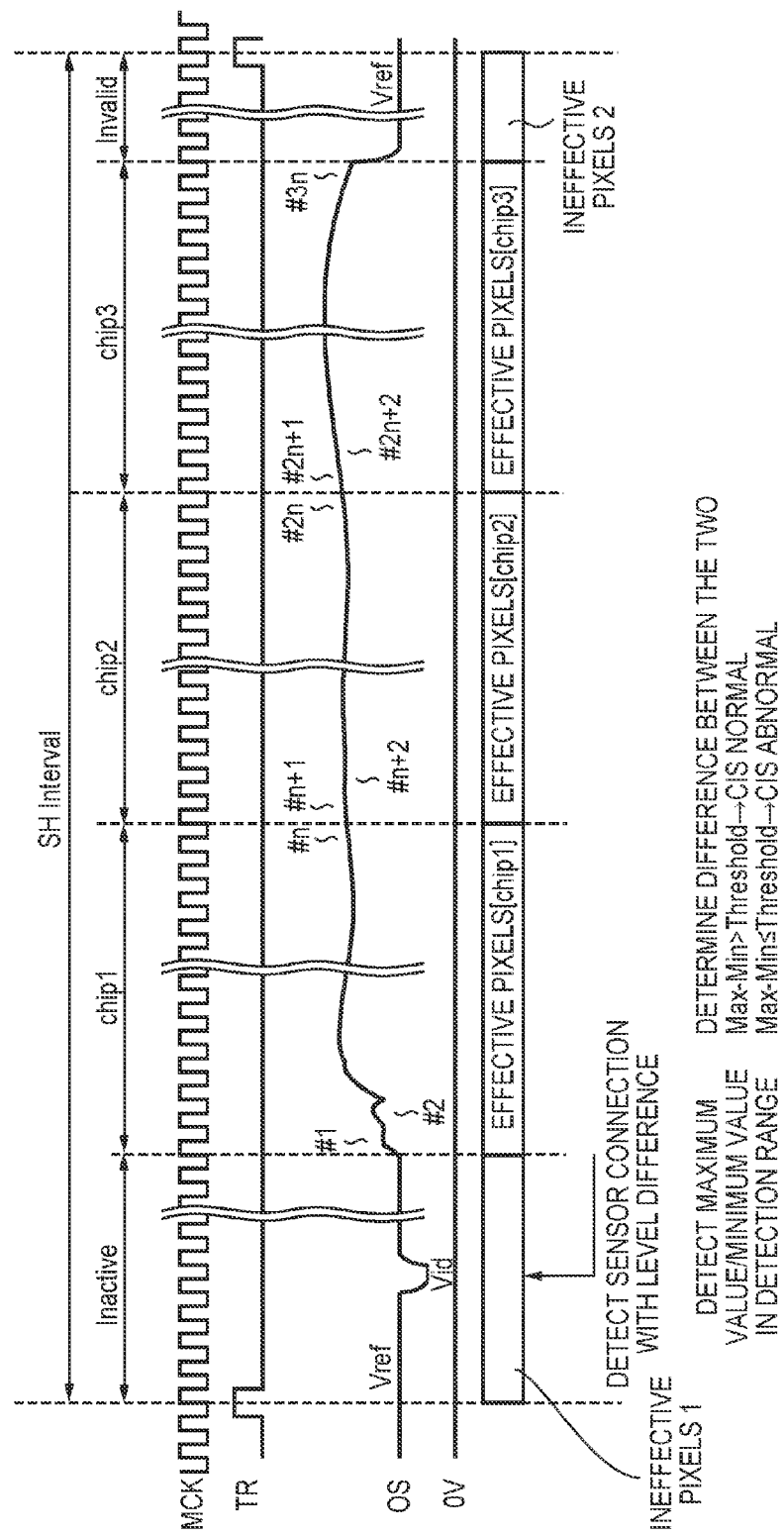
FIG. 2 is a timing chart of a reading module according to the first embodiment.

FIG. 2 is a figure that shows a timing chart of one line-worth of the analog output signal OS from the reading module 120 in the present embodiment. The present embodiment describes the case in which three sensor chips are connected in series in the reading module 120. In an actual reading module 120, generally approximately 12 chips are connected for a paper size A4 width, but for ease of description, the description will be given in term of three chips below.

The analog output signal OS of one line of the reading module 120 is output in the order of ineffective pixels 1, effective pixels, and then ineffective pixels 2 in accordance with the count of the clock MCK, using the line synchronization signal TR as the reference. The number of pixels in the ineffective pixels 1 is a number of pixels that has been determined by a sensor chip. Then the effective pixels of chip 1 to chip 3 are output. After all of the effective pixels have been output, all of the chips become invalid, and the ineffective pixels 2 are output.

In the present embodiment the identification signal Vid for detecting abnormal connections is embedded at a specific pixel position in the ineffective pixels 1 of the output image signal. The pixel position of the identification signal Vid is a position that is determined by counting the number of pixels from the line synchronization signal TR.

For the output voltage of the analog output signal OS of one line of the reading module 120, in the ineffective pixels 1 and the ineffective pixels 2, the reference voltage is Vref, the identification signal is Vid, and the voltage of the identification signal Vid is sufficiently smaller or larger than Vref so as to be able to perform connection detection. The voltage of the effective pixels changes according to the luminance of the pixels, and thus it is possible to perform image reading.

FIGS. 3 and 4 are figures that show the waveform of and determination method for the analog output OS in cases of normal connections and abnormal connections. The detection region for both is described as being from pixel 3 to pixel 12.

In the case of FIG. 3 in which the output is normal, a pixel 6 between the pixel 3 and the pixel 12 has the identification signal Vid, and when the minimum and maximum are detected in this region, the Max value is a pixel value that corresponds to Vref, and the Min value is a pixel value that corresponds to Vid. By setting the threshold value Thresh in the vicinity of the center of these two values, the expression Max−Min>Thresh is satisfied in normal cases.

In the case of FIG. 4 in which the line synchronization signal is disconnected and there is an abnormal connection, the reading module is not driven normally from pixel 3 to pixel 12, and all sensor chips will be invalid ineffective pixels 2. For this reason, if Max−Min is calculated by detecting the maximum and minimum in the region from pixel 3 to pixel 12 similarly to normal cases, the expression Max−Min Thresh is satisfied.

As described above, an abnormal connection of the reading module 120 can be detected from the difference in results between normal cases and abnormal cases.

Next is a description of the method of embedding the identification signal in the analog output of the reading module. A description of FIG. 5 that shows the circuit configuration of the reading module is given first, and then FIG. 6 that shows a timing chart of internal signals is described. Thereafter, the internal configuration of the sensor chip and the circuit that embeds the identification signal are explained.

Figure 5:
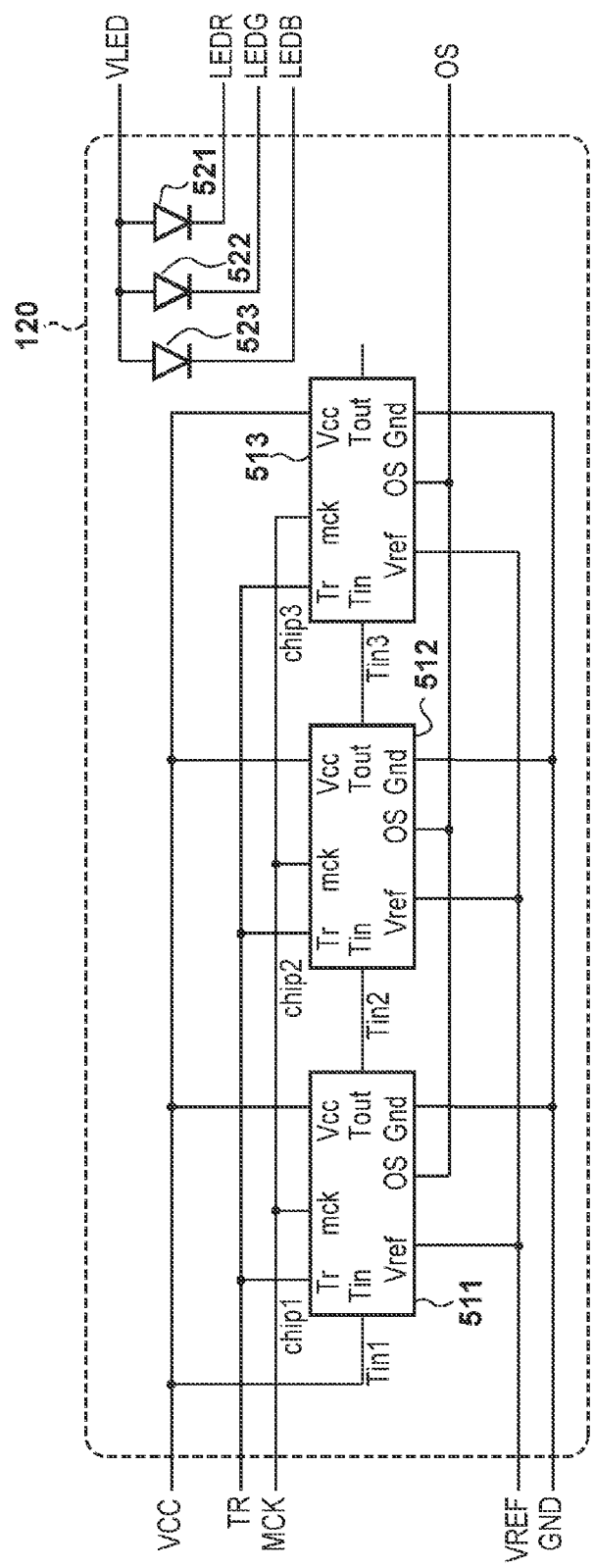
FIG. 5 is a diagram showing a configuration of the reading module according to the first embodiment.

FIG. 5 shows an internal circuit configuration of the reading module 120. The sensor chip is described as 3 chips similarly to the above-described content. The internal portion is constituted by sensor chips 511 to 513. Light sources are respectively constituted as a red LED (521), a green LED (522), and a blue LED (523), and reading of a color image is possible.

Tin/Tout terminals of the sensor chips are used to connect the sensor chips in series. A Tint terminal of a sensor chip 1 (511) is connected to VCC, and a Tout1 terminal of the sensor chip 1 (511) and a Tin2 terminal of a sensor chip 2 (512) are connected. Also, the Tout2 terminal of the sensor chip 2 (512) and a Tin3 terminal of a sensor chip 3 (513) are connected.

As for the other terminals of the sensor chips, MCK is a clock signal input, TR is a line synchronization signal, VREF is a reference voltage input, and VCC and GND are the power source and the ground. Also, OS is the analog image signal output. The MCK, TR, VREF, and OS terminals are connected in parallel to the sensor chips.

Figure 6:
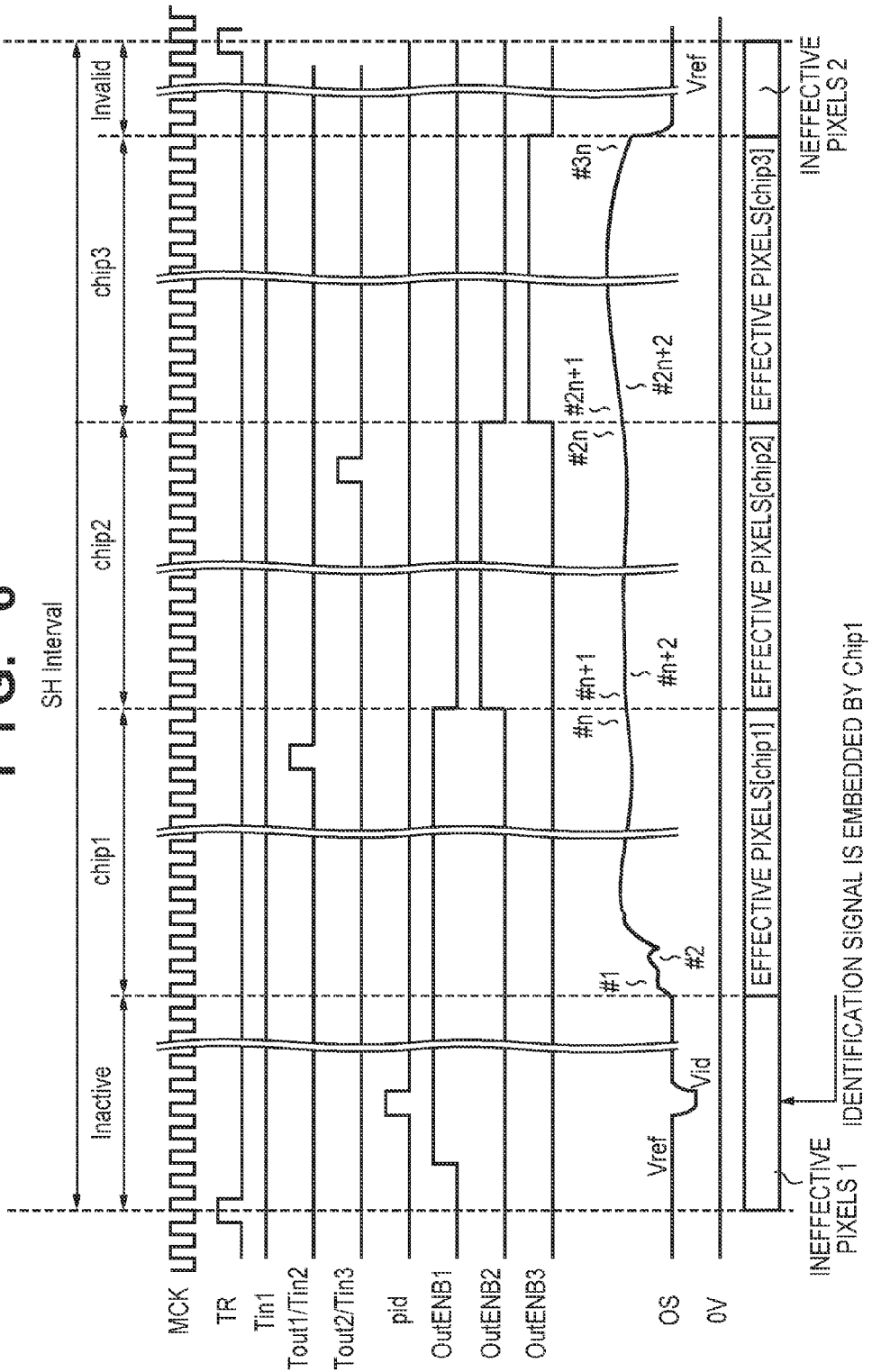
FIG. 6 is a timing chart of internal signals of the reading module according to the first embodiment.

FIG. 6 shows a timing chart of the internal circuit of the reading module 120. As described above, the output signal of the reading module 120 is output as the ineffective pixels 1, effective pixels (chip 1), effective pixels (chip 2), effective pixels (chip 3), and the ineffective pixels 2, and the identification signal is embedded by the sensor chip 1 (511).

In the head chip 1, the Tin terminal is connected to VCC, and therefore at the time at which the line synchronization signal TR is active, Tin is High. In the chip 2 (512) and the chip 3 (513), it is Low. Accordingly, it can be determined that the chip 1 is the head chip. The chip 1 counts the pixels from the TR, and outputs an identification signal when a predetermined pixel position is reached. An output enable signal OutEnb1 of the chip 1 internal portion for the output of the identification signal is High only at this time. Then, after the chip 1 has counted a predetermined number of ineffective pixels, the output of effective pixels is performed. In order to output the effective pixels, the output enable signal OutEnb1 is High during this period. Lastly, the chip 1 activates the Tout terminals at the time at which the output of effective pixels has ended in order to notify the output timing of the chip 2.

The chip 2 (512) receives a Tout terminal signal from the chip 1 and begins the output of effective pixels. After this, the chip 2 outputs its own effective pixels likewise to the chip 1. At the timing at which the chip 2 outputs the effective pixels, an output enable signal OutEnb2 of the inner portion is activated. The chip 2 activates the Tout terminal at the time at which the output of the effective pixels has ended, likewise to the chip 1. The chip 3 then performs operations similarly to the chip 2, and outputs all of the pixels of the chip 3. After all of the pixels of the reading module 120 have been output, the output becomes the ineffective pixels 2, which is a period in which the output is invalid, and all of the chips are clamped at Vref and the reference voltage is output.

Figure 7:
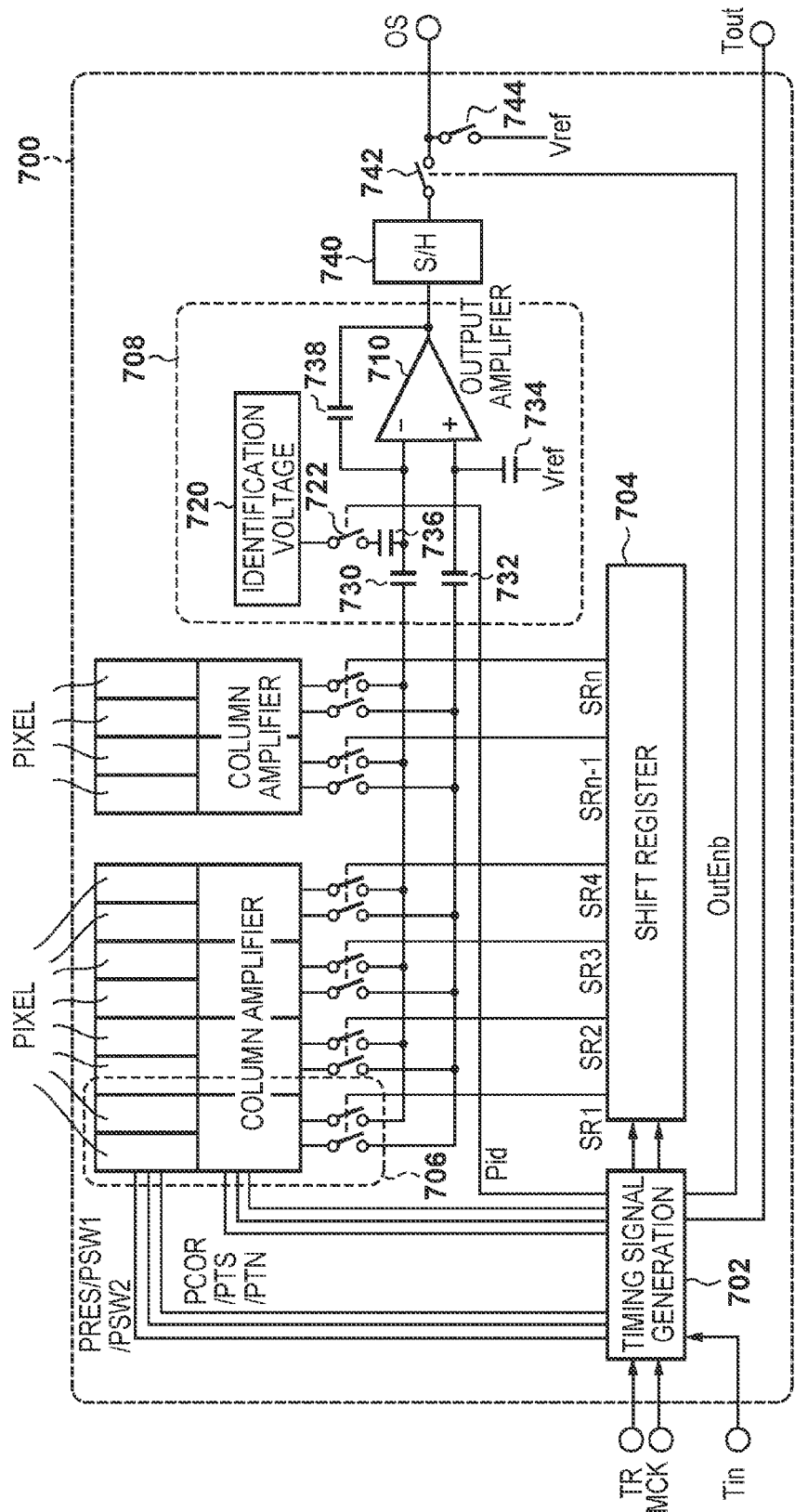
FIG. 7 is a configuration diagram of a sensor chip inside the reading module according to the first embodiment.

FIG. 7 shows an internal configuration 700 of the sensor chips 511 to 513. The sensor chips include a timing signal generator unit 702, a shift register 704, a pixel & accumulation unit 706, an image signal output unit 708, an S/H circuit 740, an output enable switch 742, and a Vref clamp circuit 744.

The timing signal generator portion 702 receives the clock MCK, the line synchronization signal TR, and an output timing input Tin, counts the number of pixels from the line synchronization signal, and generates various types of the sensor internal timing signals.

Specifically, the generation of the timing signal for the shift register 704, the generation of the timing signal for the pixel & accumulation unit 706, the generation of the timing signal for embedding the identification signal, the generation of the output enable signals of the sensor chips, the generation of an output timing Tout of the next chip, and the like are performed. Note that the timing signal generation unit 702 activates a Pid signal in the case of accepting the Tin signal and the TR signal. In other words, only the chip 1 can accept the Tin signal, and therefore only the chip 1 can issue the Pid signal, and the processing for embedding the identification signal is executed.

The shift register 704 generates the timing to output the effective pixels, activates the pixel & accumulation units one by one, and outputs pixel signals accumulated in the accumulation unit. The output unit 708 is constituted by an operational amplifier 710, an identification voltage generator unit 720, an identification signal insertion switch 722, and switched capacitor circuits 730, 732, 734, 736 and 738 (hereinafter abbreviated to SC), and generates the output voltages applied to the sensor chips.

The S/H circuit 740 samples and holds the voltage of the output portion 708 and stabilizes the output voltage, and the output enable switch 742 controls the output of the sensor chip, and these units are needed in cases in which multiple sensor chips are connected as in the present embodiment. The Vref clamp circuit 744 performs clamping so that the output voltage of the sensor module is stable at the Vref at the time of ineffective pixels.

The output portion 708 amplifies the signals from the pixels according to the SC capacitance ratio, performs addition/subtraction for insertion of the identification signal, and outputs the resulting voltages. By the identification signal insertion switch 722 being ON only at the identification signal insertion timing, the output is the result of subtracting the identification voltage from the reference voltage Vref. Note that subtraction is used for the description of the present specification, but it may be addition.

Figure 8:
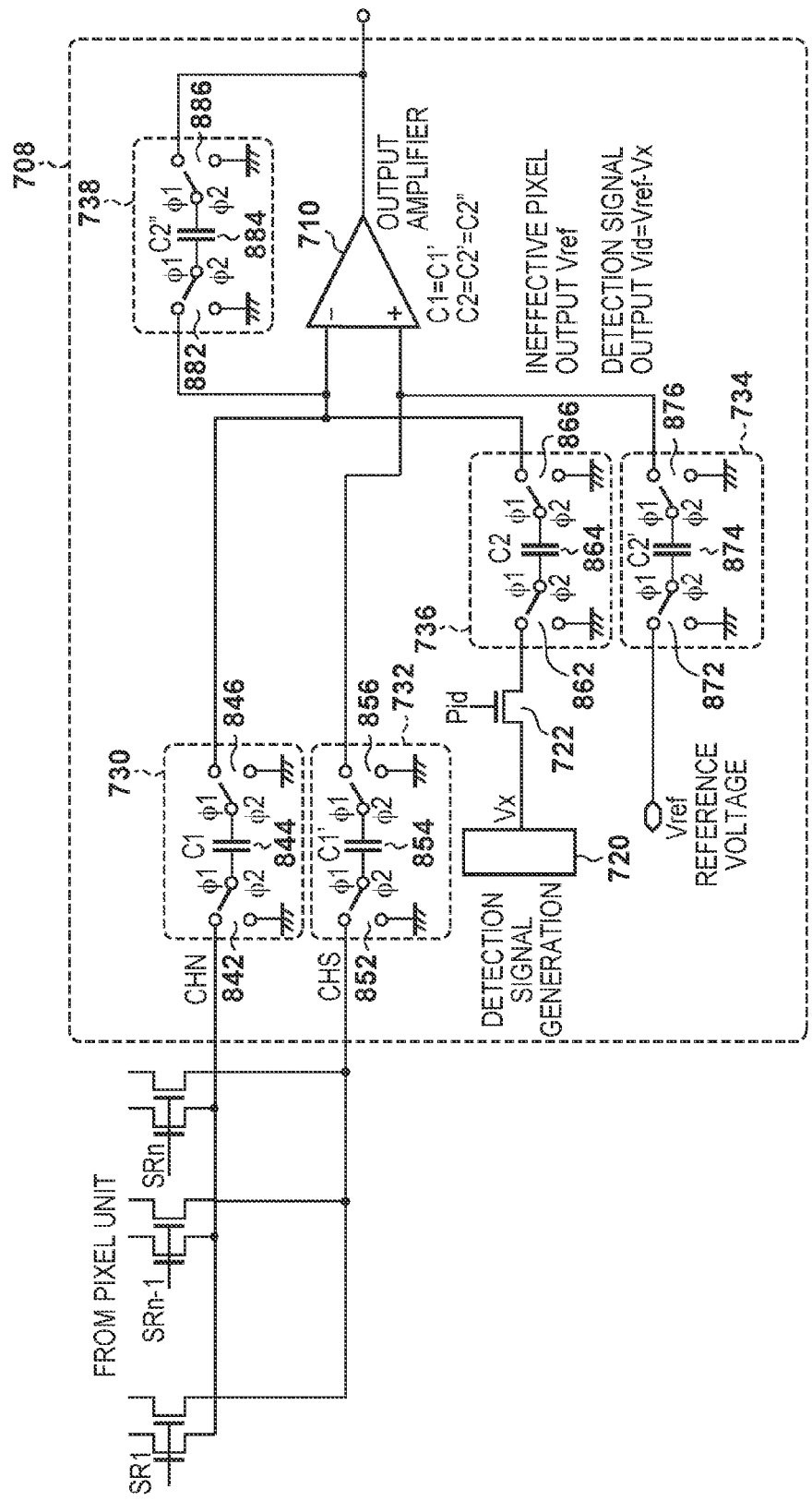
FIG. 8 is a configuration diagram of an identification signal embedding unit in the sensor chip according to the first embodiment.

The SC produces pseudo resistance using the switch and capacitor. The resistance value is determined by the capacitance of the capacitor. There are input pixel SCs 730 and 732, reference voltage and identification signal SCs 734 and 736, and an operational amplifier SC 738. FIG. 8 shows a detailed configuration of the output portion.

The configuration and operations are not described in detail here, but the identification signal insertion switch 722 is ON only when the identification signal is to be inserted, and is otherwise OFF. Also, when the image signal is to be output, the shift register and its switches are turned ON, and signals CHS/CHN from the pixels are enabled.

When the identification signal is to be inserted, the SC 734 for the reference voltage Vref, the SC 736 for an identification voltage Vx, and the SC 738 for feedback of the operational amplifier are enabled, and the capacitances of the SCs are all the same as C2=C2'=C2, and thus amplification is not performed, and a subtracting circuit is formed. Accordingly, the voltage output of the identification signal is Vid=Vref−Vx. The CPU 144 of the ASIC 141 here can detect and identify connections of the reading module if the identification signal Vid and the reference voltage Vref have a sufficient potential difference.

The identification voltage Vid is the differential output with the reference voltage in the sensor chip. The reason for this is that in the case of the differential output, it is possible to cancel out the offset of the operational amplifier 710 and the offset of the S/H circuit 740, and eliminate the individual variation of a sensor chip.

Figure 9:
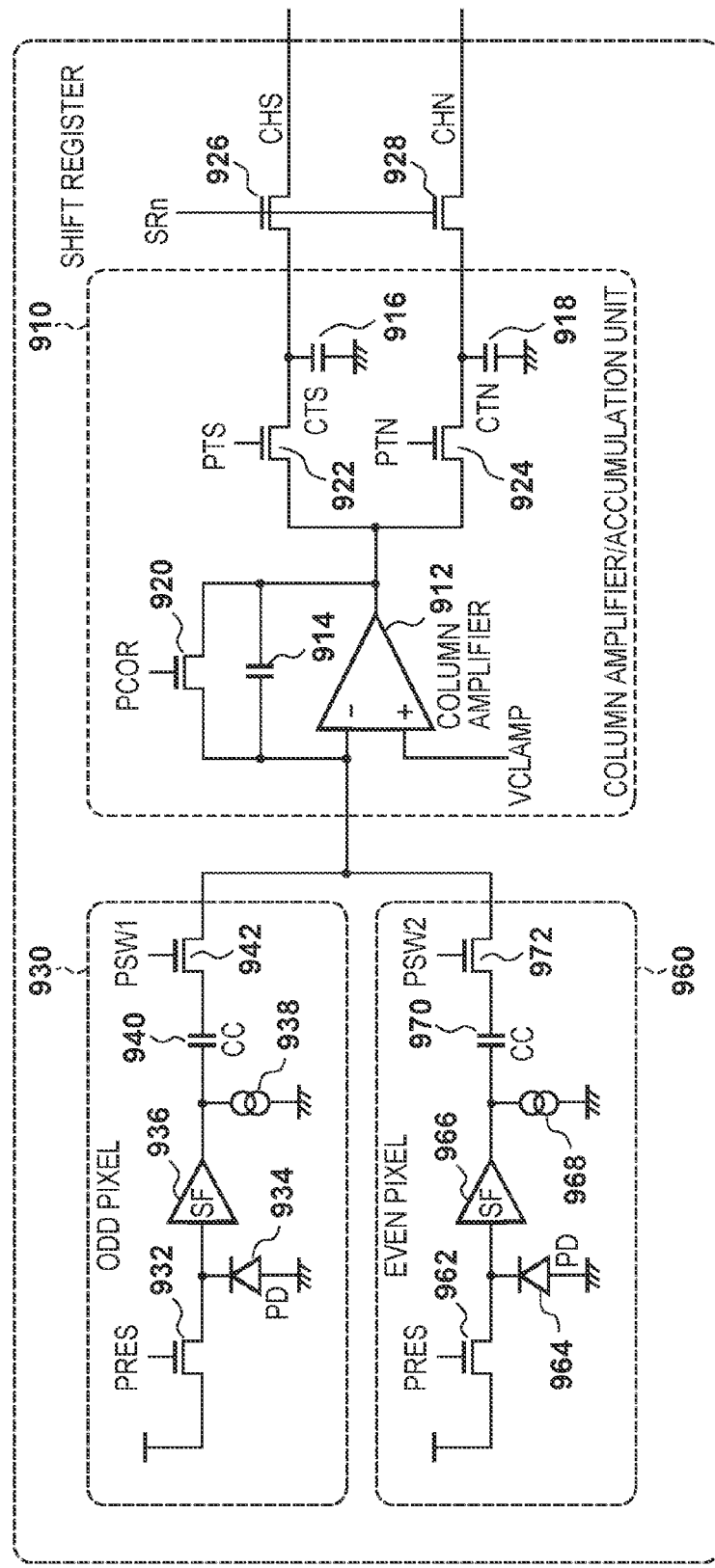
FIG. 9 is a configuration diagram of a pixel portion and an accumulation portion in the sensor chip according to the first embodiment.

FIG. 9 shows the configuration of the pixel & accumulation unit 706. This is the configuration of a CMOS sensor in which two pixels, namely an even-numbered pixel and an odd-numbered pixel, are constituted in one column amplifier. Detailed operations are described in Japanese Patent Laid-Open No. 2014-22774, and therefore will not be described here.

The following describes the overall configuration of the apparatus and a flowchart for when connection detection is performed. Note that the flowcharts of this specification are realized by the CPU 144 reading out and executing programs that are related to the flowcharts.

Figure 13:
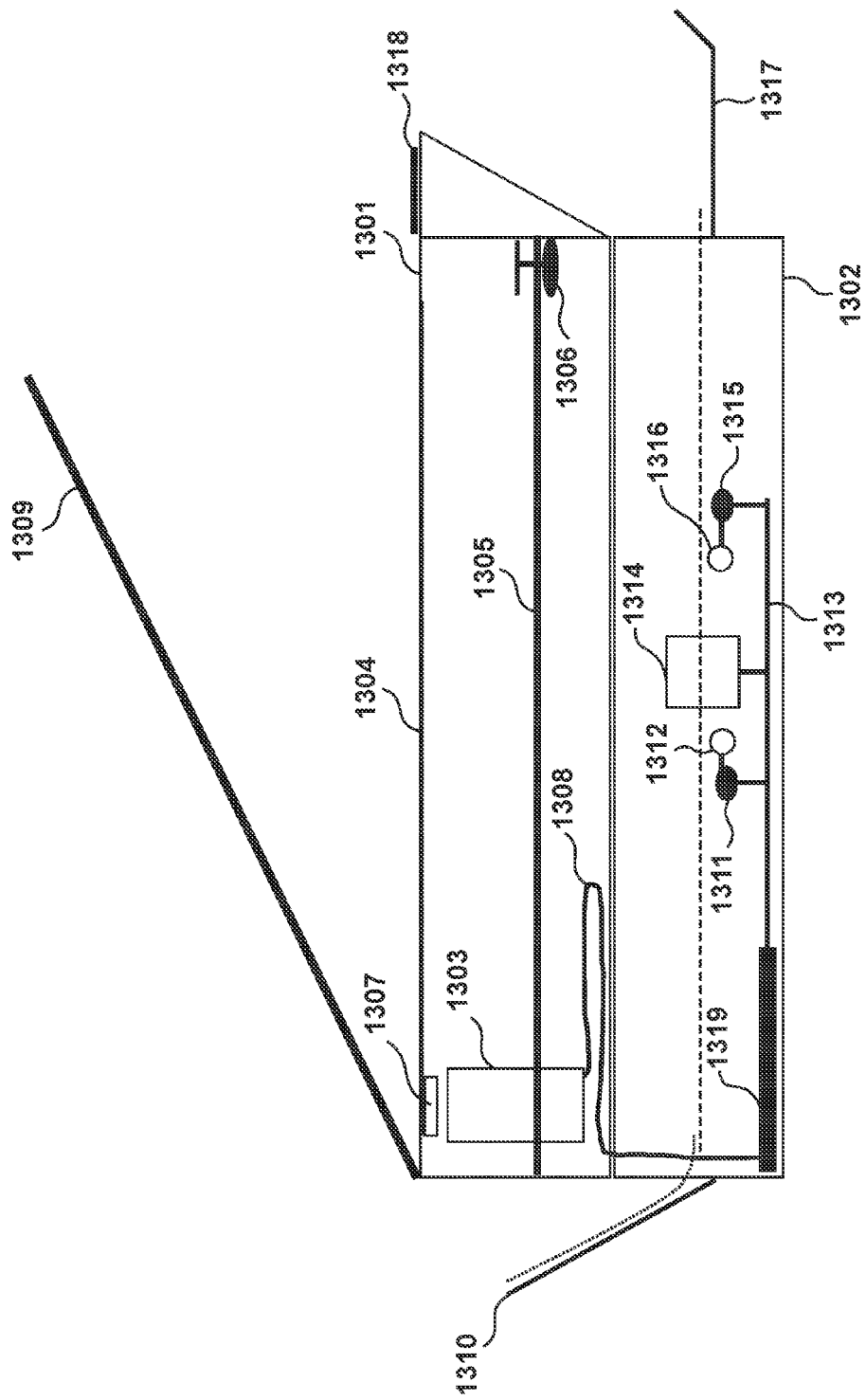
FIG. 13 is a diagram that shows an example of the image reading apparatus.

FIG. 13 shows the overall configuration of the apparatus. The apparatus is a compound machine, and is largely constituted by a scanner unit 1301 on the upper side, and a printer unit 1302 on the lower side.

The scanner unit 1301 is configured by a CIS module 1303, a glass platen 1304, a reading shaft 1305, a reading motor 1306, a reference white board 1307, an FFC 1308, and an original pressing plate 1309. The CIS module 1303 moves underneath the glass platen using the reading motor 1306 and scans images.

The printer unit 1032 is configured by a paper feed tray 1310, an LF motor 1311, an LF shaft 1312, a flat cable 1313, a carriage 1314, a paper ejection motor 1315, a paper ejection shaft 1316, and a paper ejection tray 1317. A recording sheet on the paper feed tray is subjected to printing by being sent over the carriage via the LF shaft. The recording sheet is sent to the paper ejection tray 1317 via the paper ejection shaft 1316 after printing.

Figure 14:
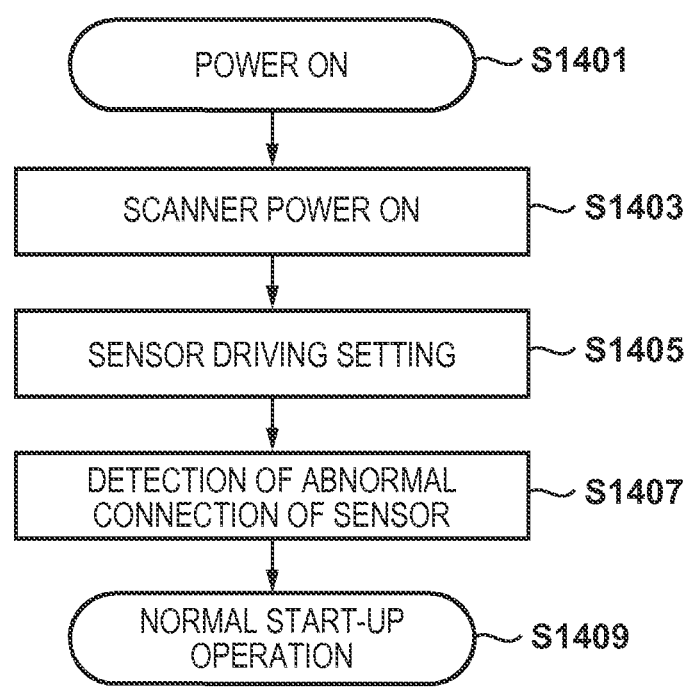
FIG. 14 is a flowchart for describing connection detection.
Figure 15:
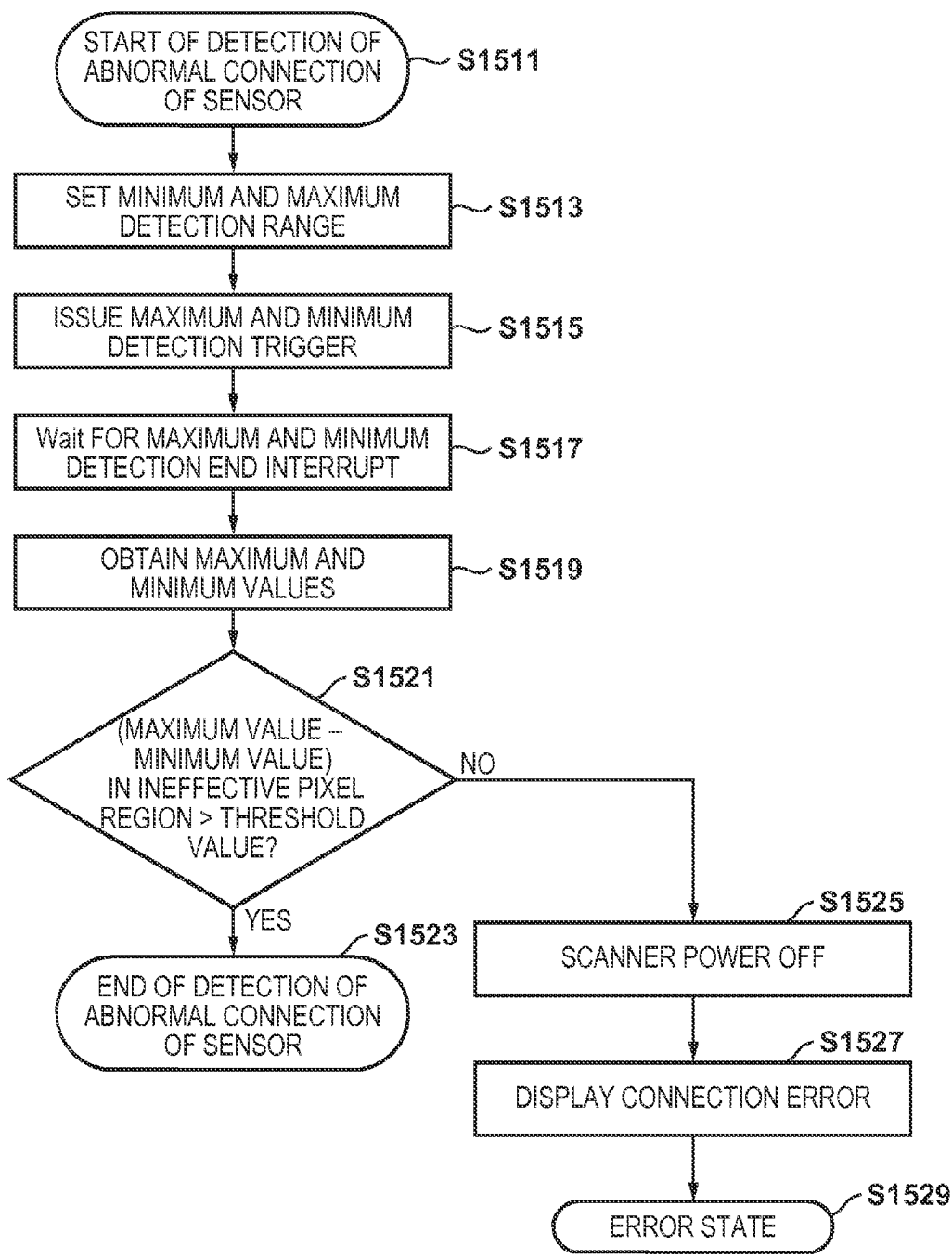
FIG. 15 is a flowchart for describing connection detection.

FIG. 14 and FIG. 15 show a flowchart for when connection detection is performed. Detection is performed immediately after the power is turned ON. First, when the power has been turned on (step S1401), the CPU 144 turns the power on for the scanner system (step S1403). The CPU 144 performs sensor driving setting for output of the sensor driving signal, and achieves a state in which sensor connections can be detected (step S1405). Then the CPU 144 performs connection detection (step S1407). If the connection detection results in step S1407 are normal, the procedure moves to normal start-up operations (step S1409).

FIG. 15 shows the flow when connection detection is actually performed. At the start of detection of abnormal connection of the sensor (step S1511), the CPU 144 performs the setting of the detection range for a maximum value minimum value detection circuit (step S1513), and issues a trigger to the circuit for maximum value minimum value detection (step S1515). According to the above processing, the maximum value minimum value detection circuit (160) cuts out a region of ineffective pixels that includes the connection identification signal from one line-worth of pixel data. Then, the minimum value and the maximum value of these pixels are stored respectively in a minimum value register (162) and a maximum value register (164), and an interrupt is issued to the CPU 144 which is waiting for the interrupt (step S1517). The CPU 144 obtains the maximum value and the minimum value (step S1519) due to receiving a detection end interrupt, and compares the difference between the maximum value and the minimum value with the threshold value (step S1521). In the case where the difference is larger than the threshold value, it is deemed that connection is normal, and this procedure is ended as is (step S1523). In the case where the difference is smaller than the threshold value, the CPU 144 turns the scanner power off (step S1525), then notifies the user of a sensor connection error (step S1527), and thereafter enters an error state (step S1529).

Second Embodiment

Figure 10A:
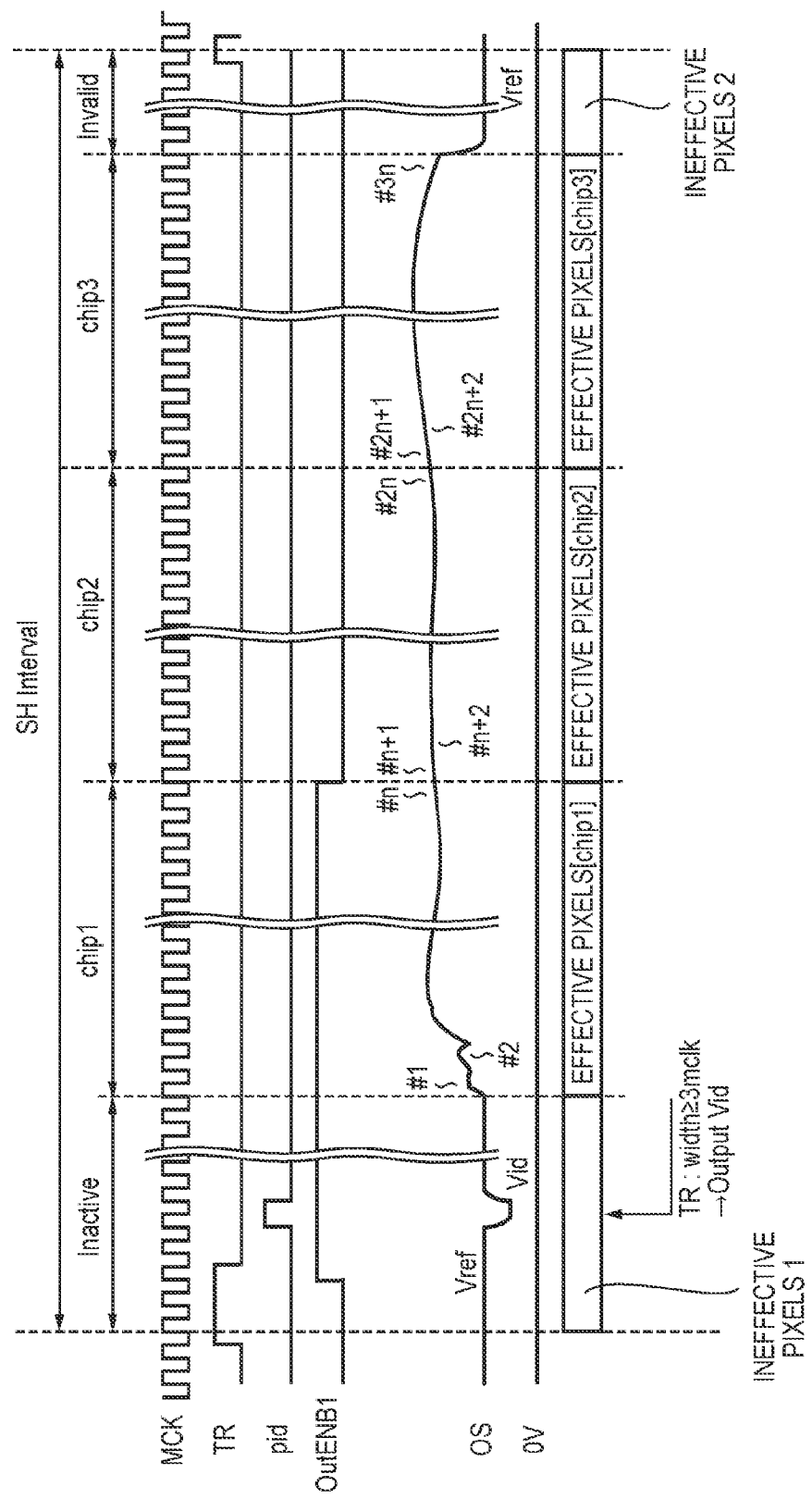
FIG. 10A is a timing chart for detection performed by the reading module according to a second embodiment.

FIG. 10A and FIG. 10B show a sensor output timing chart of the reading module of a second embodiment. A major difference with the first embodiment is that the operations of inserting and not inserting an identification signal are switched by changing the pulse width of the line synchronization signal TR.

In the case in which the identification signal is to be inserted, the pulse width of the TR set wide, and in the case in which the identification signal is not to be inserted, the pulse width of the TR is set narrow. Accordingly, the switching of the operation mode is performed within the sensor chip. In an actual configuration, the pulse width of the line synchronization signal is detected in the timing signal generation circuit 702 shown in FIG. 7, which shows the internal configuration of the sensor chip, and there is a switch between whether or not to activate the timing Pid signal for insertion of the identification signal.

According to the present embodiment, the identification signal embedding processing is executed only in the case in which it is determined whether the connection is suitable, and therefore the processing load can be reduced.

Third Embodiment

Figure 11B:
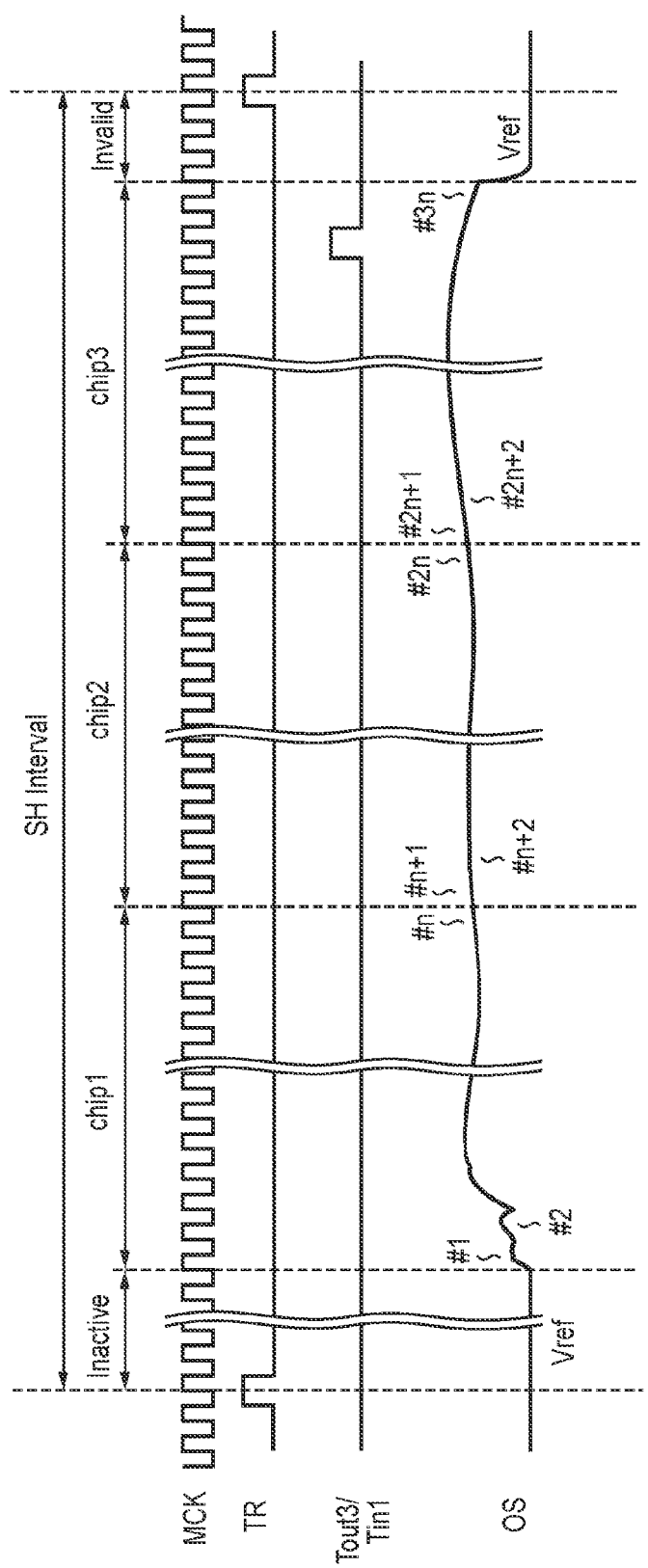
FIG. 11B is a timing chart for scanning performed by the reading module according to the third embodiment.

FIG. 11A and FIG. 11B show timing charts of a third embodiment. A difference with the first embodiment is the pixel position of the output of the connection identification signal. In the first embodiment, the identification signal is inserted immediately after the line synchronization signal, but in the third embodiment, the identification signal is inserted after pixel output corresponding to all of the pixels has been output.

FIG. 11A is a timing chart in the case in which connection detection is performed, and FIG. 11B is a timing chart in the case in which an image is scanned. When connection detection is to be performed, the number of pixels in one line from the pixel position of the identification signal is set high, and when an image is to be scanned, the number of pixels in one line is set smaller than the pixel position of the identification signal, and thus it is possible to insert the identification signal only when connection detection is to be performed.

Figure 12:
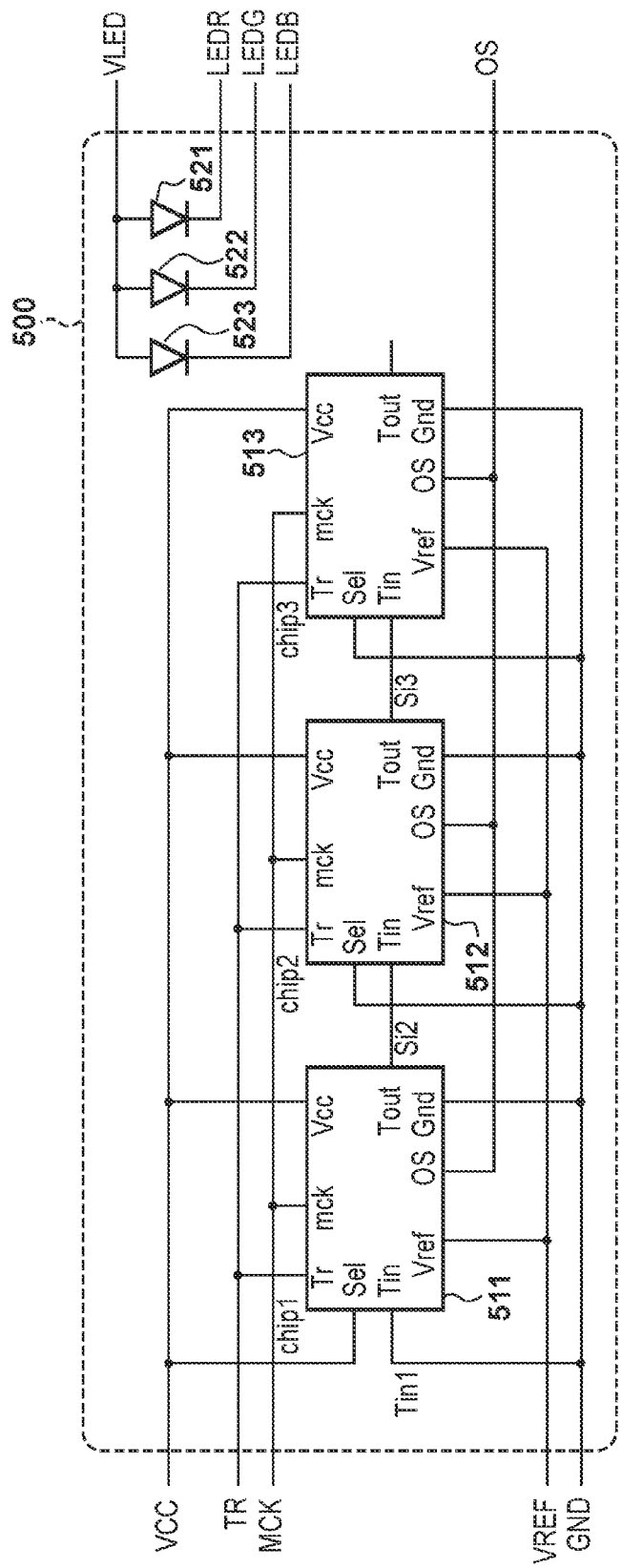
FIG. 12 is a configuration diagram of the reading module according to the third embodiment.

In the third embodiment, the identification signal is inserted after signals for all of the pixels have been output, and therefore the configuration of the reading module needs to be changed. This configuration is shown in FIG. 12. A major difference with the first embodiment is that the Tout terminal of the last series-connected sensor chip (here, a three-chip configuration is employed, and therefore this terminal corresponds to the Tout 3 of the sensor chip 3 (513)) is connected to the Tin signal (Tin1 terminal) of the sensor chip 1 (511). According to this configuration, the connection identification signal can be inserted by the sensor chip 1 after output for all of the pixels of the sensors has ended.

Also, the Tin1 terminal of the sensor chip 1 is used for the timing of the insertion of the identification signal, and therefore a SEL terminal is added to each of the sensor chips to separate the head chip from the subsequent chips. SEL is a signal that indicates the head chip when it is High, and indicates the subsequent chips when it is Low.

As in the timing charts (FIG. 11A and FIG. 11B) of the third embodiment, the period of the line synchronization signal TR (pixel period) for the case of performing connection detection and the case of performing image scanning may be changed by the driving signal sent to the reading module. Also, while not shown in the figures, the frequency of the clock MCK can also be changed. This may also be applied to the first embodiment or the second embodiment.

There are several reasons for changing the driving signal, such as for shortening the detection time and switching between whether or not to insert the identification signal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157049, filed Jul. 31, 2014, which is hereby incorporated by reference herein in its entirety.

What is claimed is:

1. An image reading apparatus comprising:
at least one processor configured to implement:
an output unit which outputs a trigger signal to an image reader;
an acquisition unit which acquires, in a main body of the image reading apparatus, a signal output from the image reader, wherein the image reader outputs an ineffective pixel signal which does not react to light and an effective pixel signal which reacts to light, and wherein, in a case that the trigger signal is output, the image reader further outputs an identification signal during at least a part of an ineffective pixel period in which the ineffective pixel signal is output and the effective pixel signal is not output; and
a determination unit which determines whether or not the image reader is correctly connected to the main body of the image reading apparatus, based on a signal output from the image reader during at least the part of the ineffective pixel period after the trigger signal has been output,
wherein in a case that the identification signal is not acquired by the acquisition unit in the main body of the image reading apparatus during the ineffective pixel period after the trigger signal has been output, it is determined that the image reader is not correctly connected to the main body of the image reading apparatus.

2. The image reading apparatus according to claim 1, wherein determination of whether or not the image reader is connected correctly to the main body of the image reading apparatus is performed by comparing the signal acquired from the image reader during the ineffective pixel period after the trigger signal has been output to a predetermined threshold value.

3. The image reading apparatus according to claim 1, wherein determination of whether or not the image reader is connected correctly to the main body of the image reading apparatus is performed by comparing a predetermined threshold value with a difference between the maximum signal level and the minimum signal level of the signal acquired from the image reader during the ineffective pixel period after the trigger signal has been output.

4. The image reading apparatus according to claim 1, wherein, in a case that the trigger signal has been output, the image reader outputs the identification signal during the ineffective pixel period before an effective pixel period in which the effective pixel signal is output.

5. The image reading apparatus according to claim 1, wherein, in a case that the trigger signal has been output, the image reader outputs the identification signal during the ineffective pixel period after an effective pixel period in which the effective pixel signal is output.

6. The image reading apparatus according to claim 1, wherein different trigger signals are output in a case where whether the image reader is correctly connected to the main body of the image reading apparatus or not is determined and a case where whether the image reader is correctly connected to the main body of the image reading apparatus or not is not determined.

7. The image reading apparatus according to claim 6, wherein different trigger signals in which a one-line pixel period is different are output in a case where whether the image reader is correctly connected to the main body of the image reading apparatus or not is determined and a case where whether the image reader is correctly connected to the main body of the image reading apparatus or not is not determined.

8. The image reading apparatus according to claim 1, wherein at least one of the at least one processor is configured to further perform the operations of a power supply control unit which controls the image reader to turn off in a case that it is determined that the image reader is not correctly connected to the main body of the image reading apparatus.

9. The image reading apparatus according to claim 1, wherein at least one of the at least one processor is configured to further perform the operations of a notification unit which notifies a user in a case that it is determined that the image reader is not correctly connected to the main body of the image reading apparatus.

10. The image reading apparatus according to claim 1, wherein determination of whether or not the image reader is connected correctly to the main body of the image reading apparatus is performed based on the signal acquired from the image reader at a first timing during the ineffective pixel period after the trigger signal has been output and the signal acquired from the image reader at a second timing different from the first timing during the ineffective pixel period after the trigger signal has been output by the output unit.

11. The image reading apparatus according to claim 1, wherein, in a case that the trigger signal is output, the image reader outputs the identification signal and a signal whose level is different from the identification signal during at least the part of the ineffective pixel period.

12. The image reading apparatus according to claim 1, wherein a level of a signal which is output from the image reader during the ineffective pixel period after the trigger signal has been output and in which the identification signal is included is smaller than a level of a signal which is output from the image reader during the ineffective pixel period after the trigger signal has been output and in which the identification signal is not included.

13. The image reading apparatus according to claim 1, wherein whether the image reader is correctly connected to the main body of the image reading apparatus or not is determined by determining whether the identification signal is acquired by the acquisition unit in the main body of the image reading apparatus or not during at least the part of the ineffective pixel period after the trigger signal has been output.

14. The image reading apparatus according to claim 1, wherein, in a case that the trigger signal is not acquired by the image reader, it is determined that the image reader is not correctly connected to the main body of the image reading apparatus.

15. The image reading apparatus according to claim 1, wherein the image reader is disconnectably connected to the main body of the image reading apparatus.

16. A method of controlling an image reading apparatus, the method comprising:
outputting a trigger signal to an image reader;
acquiring, in a main body of the image reading apparatus, a signal output from the image reader, wherein the image reader outputs an ineffective pixel signal which does not react to light and an effective pixel signal which reacts to light, and wherein, in a case that the trigger signal is output, an identification signal is output from the image reader during at least a part of an ineffective pixel period in which the ineffective pixel signal is output and the effective pixel signal is not output; and
determining whether or not the image reader is correctly connected to the main body of the image reading apparatus, based on a signal output from the image reader during at least the part of the ineffective pixel period after the trigger signal has been output,
wherein in a case that the identification signal is not acquired in the acquiring in the main body of the image reading apparatus during the ineffective pixel period after the trigger signal has been output, it is determined that the image reader is not correctly connected to the main body of the image reading apparatus.

17. An image reading apparatus comprising:
at least one processor configured to implement:
an output unit which outputs a trigger signal to an image reader;
an acquisition unit which acquires, in a main body of the image reading apparatus, a signal output from the image reader, wherein the image reader outputs an ineffective pixel signal which does not react to light and an effective pixel signal which reacts to light, and wherein, in a case that the trigger signal is output, the image reader further outputs an identification signal during at least a part of an ineffective pixel period in which the ineffective pixel signal is output and the effective pixel signal is not output; and
a detection unit which detects that the image reader is not correctly connected to the main body of the image reading apparatus during at least the part of the ineffective pixel period after the trigger signal has been output,
wherein in a case that the identification signal is not acquired by the acquisition unit in the main body of the image reading apparatus during the ineffective pixel period after the trigger signal has been output, it is detected that the image reader is not correctly connected to the main body of the image reading apparatus.

18. The image reading apparatus according to claim 17, wherein the image reader is disconnectably connected to the main body of the image reading apparatus.

* * * * *